United States Patent
Winter

[11] Patent Number: 5,743,361
[45] Date of Patent: Apr. 28, 1998

[54] LIGHT WEIGHT BRAKE SHOE APPARATUS WITH REMOVABLE FRICTION PAD

[75] Inventor: Klaus Winter, Hardegsen, Germany

[73] Assignee: ITT Automotive, Inc., Auburn Hills, Mich.

[21] Appl. No.: 778,113

[22] Filed: Jan. 2, 1997

Related U.S. Application Data

[63] Continuation of Ser. No. 468,720, Jun. 6, 1995, abandoned.

[51] Int. Cl.⁶ ............................................. F16D 69/00
[52] U.S. Cl. ................. 188/250 G; 188/244; 188/250 B
[58] Field of Search ........................... 188/73.1, 71.6, 188/264 A, 264 AA, 250 B, 250 G, 242, 244, 245, 247, 2.34, 73.38

[56] References Cited

U.S. PATENT DOCUMENTS

| | | | |
|---|---|---|---|
| 2,504,712 | 4/1950 | Mann | 188/244 |
| 2,684,133 | 7/1954 | Chester, Sr. | 188/244 |
| 3,275,105 | 9/1966 | Petit | 188/250 B |
| 3,400,789 | 9/1968 | Mione | 188/264 AA |
| 3,477,551 | 11/1969 | Beuchle | 188/250 B |
| 3,482,656 | 12/1969 | Shakespear | 188/71.6 |
| 4,090,591 | 5/1978 | Pollinger et al. | 188/250 G |
| 4,263,992 | 4/1981 | Moore et al. | |
| 5,038,899 | 8/1991 | Weiler | |
| 5,119,909 | 6/1992 | Shim | |
| 5,219,047 | 6/1993 | Fouilleux et al. | |
| 5,385,216 | 1/1995 | Kulczcki | |
| 5,396,972 | 3/1995 | Grele | 188/250 G |

*Primary Examiner*—Matthew C. Graham
*Attorney, Agent, or Firm*—Thomas N. Twomey; J. Gordon Lewis

[57] ABSTRACT

A light-weight brake shoe for a rotary disc brake having a removable and replaceable friction pad. The brake shoe provides a thin-walled backing plate having a side wall for cooperatively engaging the friction pad. The side wall of the backing plate has a pair of raised lip portions for cooperatively engaging a complementary groove provided in the bottom wall of the friction pad. An irregularly shaped spring cooperatively engages a tapered groove provided in the top wall of the friction pad for biasing the friction pad into cooperative engagement with the side wall of the backing plate. The tapered groove of the friction pad provides a downwardly and inwardly biasing force in order that the friction pad maintains cooperative engagement with the side wall of the backing plate while also ensuring that the friction pad avoids dragging on the brake rotor of the vehicle when the brake is not activated.

11 Claims, 1 Drawing Sheet

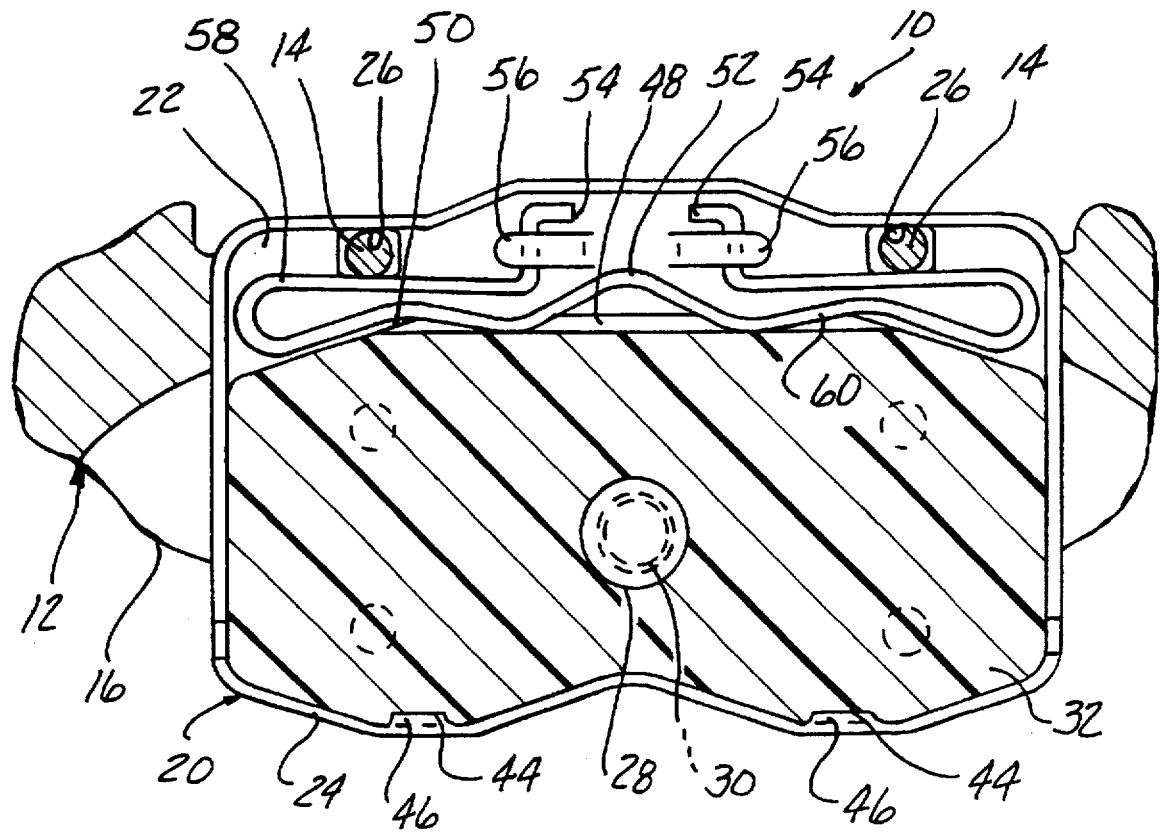
FIG·1
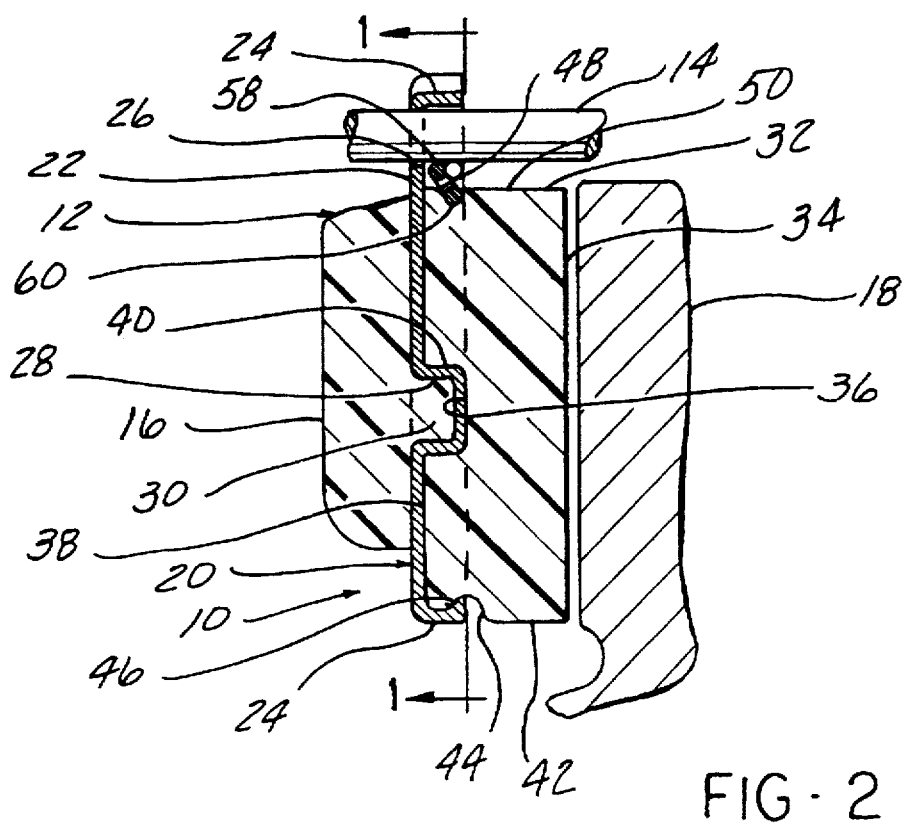
FIG·2

LIGHT WEIGHT BRAKE SHOE APPARATUS WITH REMOVABLE FRICTION PAD

This application is a continuation of application Ser. No. 08/468,720 filed on Jun. 6,1995, now abandoned.

FIELD OF THE INVENTION

The present invention relates to a brake shoe for a rotary disc brake of a vehicle, and in particular, to a light-weight brake shoe having a removable and replaceable friction pad.

BACKGROUND OF THE INVENTION

In general, intense competition has driven the automobile industry to continuously strive to increase the quality and marketability of their products. In so doing, the automobile producers and designers continuously attempt to reduce the weight of their motor vehicles in order to minimize fuel consumption while also improving suspension characteristics. The automobile industry is also striving to design and manufacture recyclable components in order to provide a more environmentally sound product while also attempting to reduce cost and recover capital.

In today's industry, brake shoes for rotary disc brakes are typically constructed of a friction pad mounted to a backing plate. The friction pad is commonly bonded to or riveted on the backing plate. This requires that the backing plate be relatively thick and heavy in order that the backing plate may support the forces applied to the friction pad when engaging a rotating disc brake rotor of a motor vehicle.

The friction pads of the brake shoes eventually wear and may have to be replaced. Typically, the worn brake shoe is removed and replaced with a new brake shoe. As an after market service, the friction pad of the brake shoe may be replaced by loosening or breaking the rivets or bonding material connecting the friction pad to the backing plate so that the friction pad can be removed from the backing plate and replaced with a new friction pad. Such loosening of the rivets and/or the breaking of the bond is a difficult and time consuming process which commonly requires the refinishing of the backing plate as well as replacing the rivets and the bonding material.

Thus, it would be desirable to provide a light-weight brake shoe that allows for the quick and efficient replacement of the friction pad.

SUMMARY OF THE INVENTION

The present invention provides a light-weight brake shoe apparatus for selectively and operatively engaging a moveable member, such as a rotary disc of a motor vehicle. The brake shoe apparatus provides a replaceable pad means for frictionally engaging the moveable member and a pad supporting means having a side wall portion for cooperatively and releasably engaging the releasable pad means. A biasing means biases the replaceable pad means into cooperative engagement with the side wall portion of the pad supporting means.

The pad supporting means provides a substantially flat back wall with a side wall integral with and extending outwardly from the back wall of the pad supporting means. The side wall of the pad supporting means provides at least one raised lip portion integral with and extending from the side wall for cooperatively engaging the replaceable pad means. The replaceable pad means provides a groove having a shape complementary to the raised lip portion of the side wall, and the biasing means biases the replaceable pad means into cooperative engagement between the groove of the replaceable pad means and the raised lip portion of the side wall of the pad supporting means.

The pad supporting means may provide a light-weight, thin-walled backing plate fabricated from a stainless steel. The backing plate may provide a plurality of apertures for enhancing the cooling of the backing plate as well as distributing forces on the backing plate that are created by the engagement of the replaceable pad means with the moveable member. The pad supporting means is connectable to a brake caliper assembly for selectively and operatively engaging the replaceable pad means with the moveable member.

To this end, the objects of the present invention are to provide a new and improved brake shoe apparatus that is substantially lighter in weight than conventional brake shoes while also allowing for the quick and efficient removal and replacement of the friction pad.

BRIEF DESCRIPTION OF THE DRAWINGS

The description herein makes reference to the accompanying drawings wherein like reference numerals refer to like parts throughout the several views, and wherein:

FIG. 1 is a sectional view in the direction of arrows 1—1 in FIG. 2 showing the spring biasing the friction pad into cooperative engagement with the side wall of the backing plate.

FIG. 2 is a sectioned side view showing the brake shoe apparatus connected to a brake caliper assembly for engaging a rotary disc brake of a motor vehicle.

DESCRIPTION OF THE PREFERRED EMBODIMENT

FIGS. 1 and 2 show a brake shoe apparatus 10 of the present invention connected to a brake caliper assembly 12 of a motor vehicle (not shown). The brake caliper assembly 12 provides a pair of mounting bolts 14 extending through a pad supporting means of the brake shoe apparatus 10. The brake caliper assembly 12 also provides a piston 16 which cooperatively engages the pad supporting means for actuating a replaceable pad means of the brake shoe apparatus 10 into frictional engagement of a disc brake rotor 18 of the motor vehicle. The replaceable pad means is biased into cooperative engagement with the pad supporting means by a biasing means.

To reduce the weight of the brake shoe apparatus 10, the pad supporting means provides a light-weight, thin-walled backing plate 20 having a substantially rectangular, dish-like shape. The backing plate 20 has a substantially flat back wall 22 wherein the perimeter of the backing plate 20 is essentially bent to form a side wall 24 extending about the perimeter of the backing plate 20. By extending about the perimeter of the backing plate 20, the side wall 24 provides the necessary stiffness and stability needed for the thin-walled backing plate 20 to support and transmit the frictional brake forces created by the replaceable pad means frictionally engaging the disc brake rotor 18. Additional stiffness and stability may be accomplished by adding deep formed ribs (not shown) into the back wall 22 of the backing plate 20. Should the thin-walled backing plate 20 resonate and cause noise, a thin layer of insulation (not shown) may be added to the backing plate 20 to dampen the noise.

In order to connect the backing plate 20 to the brake caliper assembly 12, the back wall 22 of the backing plate 20 provides a pair of apertures 26 extending therethrough for receiving the mounting bolts 14 of the brake caliper assembly 12, as previously described. The back wall 22 of the backing plate 20 also provides a cylindrical recess 28 stamped into the back wall 22 of the backing plate 20 and extending toward the replaceable pad means. The cylindrical recess 28 of the back wall 22 of the backing plate 20 receives a mating cylindrical hub 30 extending from the piston 16 of the brake caliper assembly 12.

Due to the reduced volume of backing plate material required by the thin-walled design of the backing plate 20, the backing plate 20 may be fabricated from more expensive materials, such as stainless steel, that provide better heat insulation characteristics, are more resistant to corrosion and provide better noise dampening characteristics than other conventional backing plate materials. Thus, although these types of materials, such as stainless steel, may be more costly per unit weight, the enhancement and performance characteristics of the material may far out-weigh the difference in the cost as compared to conventional backing plate materials, especially with the weight reduction of the backing plate 20 described in the present invention.

The replaceable pad means provides a friction pad 32 fabricated from a conventional friction material utilized for conventional brake pads. The friction pad 32 has a substantially rectangular shape with a substantially flat front face 34 for frictionally engaging the disc brake rotor 18 of the motor vehicle. The friction pad 32 also has a cylindrical recess 36 formed in a back wall 38 of the friction pad 32 for receiving a cylindrical portion 40 of the backing plate 20 which defines the cylindrical recess 28 in the backing plate 20 and receives the cylindrical hub 30 of the piston 16. A bottom wall 42 of the friction pad 32 provides a pair of grooves 44 for cooperatively engaging a pair of raised lip portions 46 integral with and extending inwardly from the side walls 24 of the backing plate 20. By extending the raised lip portions 46 further away from the back wall 22 of the backing plate 20, the raised lip portions 46 may provide a warning signal that the friction pad 32 is worn and may require service.

In order to secure cooperative engagement of the friction pad 32 to the backing plate 20, the friction pad 32 provides a groove 48 along a substantial portion of a top wall 50 of the friction pad 32 for receiving the biasing means. The biasing means provides an irregular shaped spring 52 formed by shaping a metallic rod or wire into an irregular coat-hanger shape. The spring 52 has opposite ends 54 that are held by stamped straps 56 formed in the back wall 22 of the backing plate 20. The upper portion 58 of the spring 52 extends underneath the mounting bolts 14 of the brake caliper assembly 12, and the lower portion 60 of the spring 52 cooperatively engages the groove 48 provided in the top wall 50 of the friction pad 32. The groove provided in the top wall 50 of the friction pad 32 is tapered such that the lower portion 60 of the spring 52 is pulled away from the backing plate 20 and toward the upper portion 58 of the spring 52. Thus, the lower portion 60 of the spring 52 biases the friction pad 32 toward the backing plate 20 and away from the disc brake rotor 18. The inwardly biasing force of the spring 52 maintains cooperative engagement between the groove 44 in the bottom wall 42 of the friction pad 32 and the raised lip portion 46 in the side wall 24 of the backing plate 20 as well as ensuring that the friction pad 32 is biased away from the disc brake rotor 18 to avoid the friction pad 32 from engaging the disc brake rotor 18 when the brake is not activated.

In operation, the backing plate 20 is assembled to the brake caliper assembly 12 of the motor vehicle by having the mounting bolts 14 extend through the apertures 26 in the backing plate 20 and by having the cylindrical hub 30 of the piston 16 cooperatively engage the cylindrical recess 28 provided in the back wall 22 of the backing plate 20. The ends 54 of the spring 52 are inserted into the stamped straps 56 in the backing plate 20 such that the upper portions 58 of the spring 52 are adjacent the mounting bolts 14 of the brake caliper assembly 12. The friction pad 32 is assembled to the backing plate 20 by engaging the groove 48 in the top wall 50 of the friction pad 32 with the lower portion 60 of the spring 52. The tapered groove 48 directs the lower portion 60 of the spring 52 away from the back wall 22 of the backing plate 20. The friction pad 32 is forced upward against the biasing force of the spring 52 until the bottom wall 42 of the friction pad 32 can be fitted over the raised lip portion 46 extending from the side wall 24 of the backing plate 20 such that the grooves 44 provided in the bottom wall 42 of the friction pad 32 may cooperatively engage the raised lip portion 46 extending from the side wall 24 of the backing plate 20. The upper portion 58 of the spring 52 is biased against the mounting bolts 14 of the brake caliper assembly 12 to ensure that the brake shoe apparatus 10 is tightly assembled to avoid any chattering and brinelling of any contact points which may occur from a loose assembly.

When the friction pad 32 is worn to a level at which it may be replaced, the lower portion 60 of the spring 52 may be lifted by a tool (not shown), such as a pair of pliers or screwdriver, as the irregular shape of the spring 52 allows for easy lifting of the mid-portion of the lower portion 60 of the spring 52. The top wall 50 of the friction pad 32 may then be pivoted away from the back wall 22 of the backing plate 20. The friction pad 32 is then lifted outwardly away from the bottom wall 42 of the backing plate 20. A new friction pad 32 is then assembled to the backing plate 20 as previously described.

It should be noted that the present invention is not limited to a brake shoe apparatus for a disc brake rotor of a motor vehicle, but rather, the present invention may be utilized for any brake assembly which utilizes brake shoes for frictionally engaging a moveable member.

What is claimed is:

1. A brake shoe apparatus for selectively and operatively engaging a moveable member comprising:

replaceable pad means for frictionally engaging said moveable member, and said replaceable pad means having a centrally disposed recess and sidewalls;

dish shaped pad supporting means for cooperatively engaging said replaceable pad means, and said pad supporting means having a continuous sidewall substantially perpendicular to a back wall and extending along a perimeter of said pad supporting means for cooperatively engaging said sidewalls of said replaceable pad means to prohibit lateral movement of said replaceable pad means, and said pad supporting means having a centrally disposed hub portion engaging said recess of said replaceable pad means to prohibit radial movement of said replaceable pad means with respect to said pad supporting means;

means for mounting said pad supporting means wherein said mounting means extends substantially perpendicular through said pad supporting means; and means for biasing said replaceable pad means into cooperative engagement with said pad supporting means, and restraining movement of said replaceable pad means with respect to said pad supporting means.

2. The brake shoe apparatus stated in claim 1 further comprising:

at least one raised lip portion integral with and extending inwardly from said side wall; and said removable pad means having a groove with a shape complementary to said raised lip portion for cooperatively engaging said pad supporting means.

3. The brake shoe apparatus stated in claim 1, wherein said pad supporting means is connectable to a brake caliper assembly.

4. The brake shoe apparatus stated in claim 1 further comprising:

said pad supporting means fabricated from a light-weight, thin-walled metallic material.

5. The brake shoe apparatus stated in claim 4, wherein said metallic material comprises a stainless steel.

6. The brake shoe apparatus stated in claim 1 wherein said biasing means further comprises:

a spring connected to said pad supporting means and cooperatively engaging said replaceable pad means.

7. The brake shoe apparatus stated in claim 6 further comprising:

said replaceable pad means having a tapered groove for cooperatively engaging said spring and biasing said replaceable pad means toward said pad supporting means and away from said moveable member.

8. The brake shoe apparatus for selectively and operatively engaging a moveable member comprising:

a replaceable friction pad for frictionally engaging said moveable member, and said friction pad having a back side, a top side and a bottom side;

a thin walled, dish shaped backing plate having a back wall with a raised cylindrical portion formed therein and extending toward said friction pad, and a continuous sidewall substantially perpendicular with said back wall and integral with and extending outwardly from a perimeter of said back wall of said backing plate toward said friction pad wherein said side wall circumscribes a majority of said friction pad;

said side wall of said backing plate having at least one integrally raised lip portion extending inwardly from said side wall for cooperatively engaging a complementary shaped groove in said bottom side of said friction pad;

said back side of said friction pad having a centrally disposed cylindrical recess for receiving said cylindrical portion of said backing plate and prohibiting radial movement of said friction pad with respect to said backing plate;

a pair of substantially parallel mounting bolts extending through a pair of corresponding apertures in said back wall of said backing plate, and said bolts extending substantially perpendicular to said back wall of said backing plate; and a single, continuous spring having opposite ends connected to said back wall of said backing plate and having an upper portion biased against said mounting bolts, and said spring having a lower portion engaging said top side of said friction pad wherein said friction pad has a tapered groove in said top side for cooperatively engaging said lower portion of said spring, and said spring biasing said friction pad inward toward said backing plate and away from said moveable member and prohibiting movement of said friction pad with respect to said backing plate.

9. A brake shoe apparatus stated in claim 8 wherein said backing plate is connectable to a brake caliper assembly.

10. The brake shoe apparatus stated in claim 8 wherein said backing plate is fabricated from stainless steel.

11. The brake shoe apparatus stated in claim 8 wherein said back wall of said backing plate has a plurality of apertures extending therethrough for enhancing cooling of said backing plate and distributing the force on said backing plate created from the actuation of the friction pad with said moveable member.

\* \* \* \* \*